United States Patent [19]
Ferrell

[11] Patent Number: 5,526,241
[45] Date of Patent: Jun. 11, 1996

[54] INTERIOR LAMP FOR MOTOR VEHICLE

[76] Inventor: Richard Ferrell, 20027 Wayne Rd., Livonia, Mich. 48152

[21] Appl. No.: 364,557

[22] Filed: Dec. 27, 1994

[51] Int. Cl.⁶ .................................................. B60Q 1/00
[52] U.S. Cl. .................. 362/74; 362/222; 362/223; 362/279; 362/290; 362/292; 362/325
[58] Field of Search .................. 362/74, 279–281, 362/290–292, 222, 223, 325

[56] References Cited

U.S. PATENT DOCUMENTS

| 1,446,891 | 2/1923 | Fay | 362/290 |
|---|---|---|---|
| 1,591,754 | 7/1926 | Gates | 362/279 |
| 1,935,621 | 11/1933 | Donnelly | 362/279 |
| 2,475,233 | 7/1949 | Gilman | 362/325 |
| 2,999,150 | 9/1961 | Kallel | 240/7.35 |
| 4,142,227 | 2/1979 | Aikens | 362/74 |
| 4,298,912 | 11/1981 | Dearth | 362/66 |
| 4,499,528 | 2/1985 | Hawlitzki | 362/275 |
| 4,519,018 | 5/1985 | Rowland | 362/74 |
| 4,628,417 | 12/1986 | Kaminski et al. | 362/74 |
| 4,760,500 | 7/1988 | Peng | 362/74 |
| 4,947,307 | 8/1990 | Quioque | 362/279 |
| 5,070,434 | 12/1991 | Suman et al. | 362/74 |
| 5,174,644 | 12/1992 | Hermansson et al. | 362/83.1 |
| 5,282,091 | 1/1994 | Grabowski et al. | 359/893 |
| 5,286,216 | 2/1994 | Volz | 362/217 |

FOREIGN PATENT DOCUMENTS

| 435394 | 7/1991 | European Pat. Off. | 362/325 |
|---|---|---|---|
| 587233 | 1/1959 | Italy | 362/291 |
| 6-36605 | 6/1994 | Japan | 362/290 |

*Primary Examiner*—Carroll B. Dority

[57] ABSTRACT

An interior or courtesy light for a motor vehicle which provides general diffused light for the passenger compartment and which also provides directed concentrated light in selected areas of the passenger compartment. The lamp includes a fluorescent bulb defining a linear series of light sources and a plurality of louvers positioned beneath the bulb and selectively positioned to deliver concentrated light to selected areas of the passenger compartment. In a first embodiment, the louvers are fixed and are arranged in a first series directing light to the front passenger area and a second series directing light to the driver's area. In a second embodiment, the louvers are movable and may be selectively positioned by an occupant to provide directed concentrated light to a selected area of the passenger compartment.

20 Claims, 6 Drawing Sheets

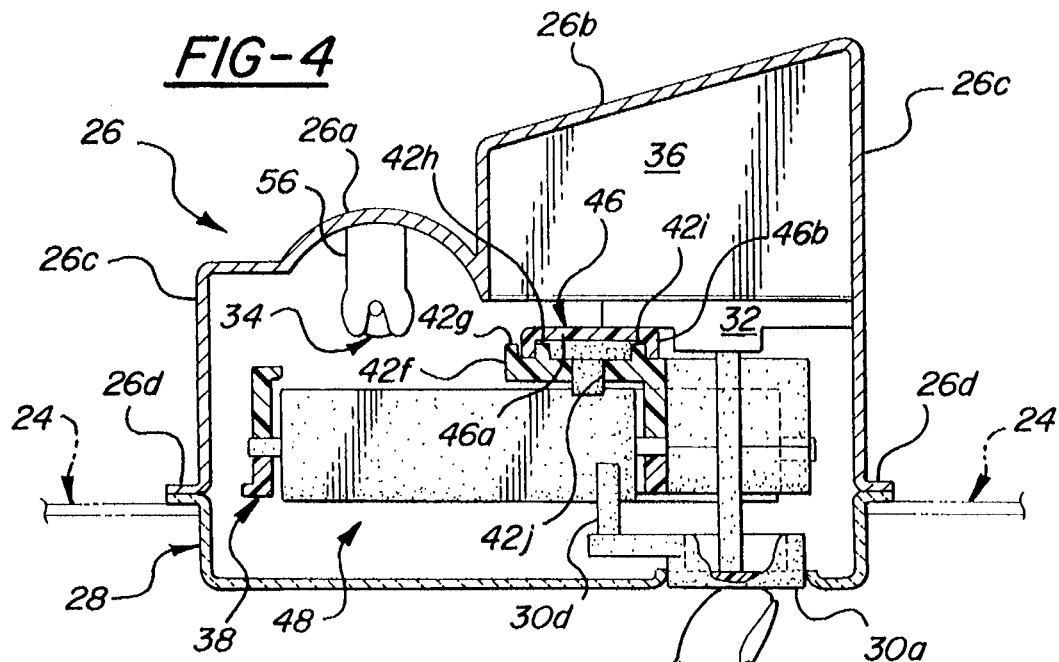
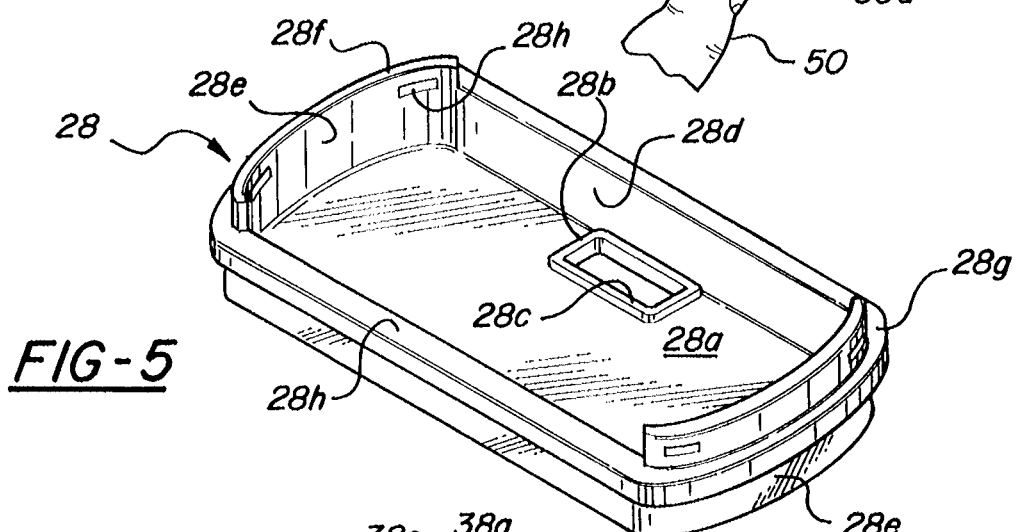
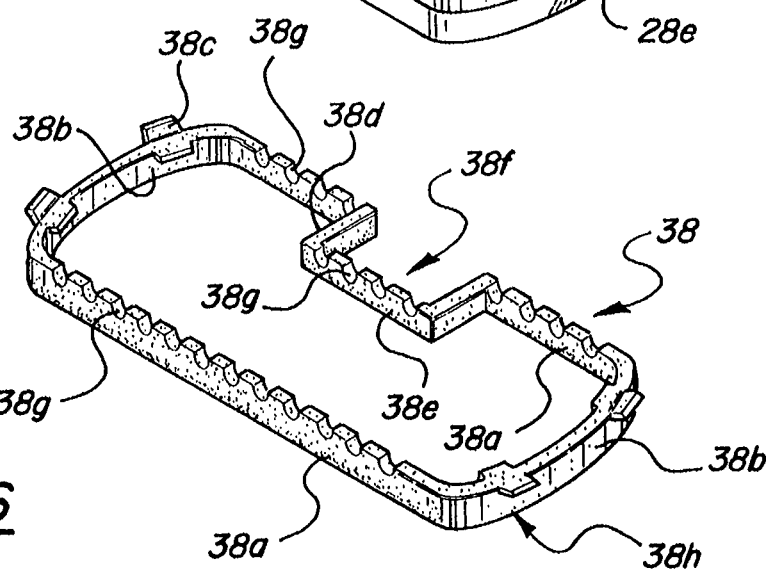

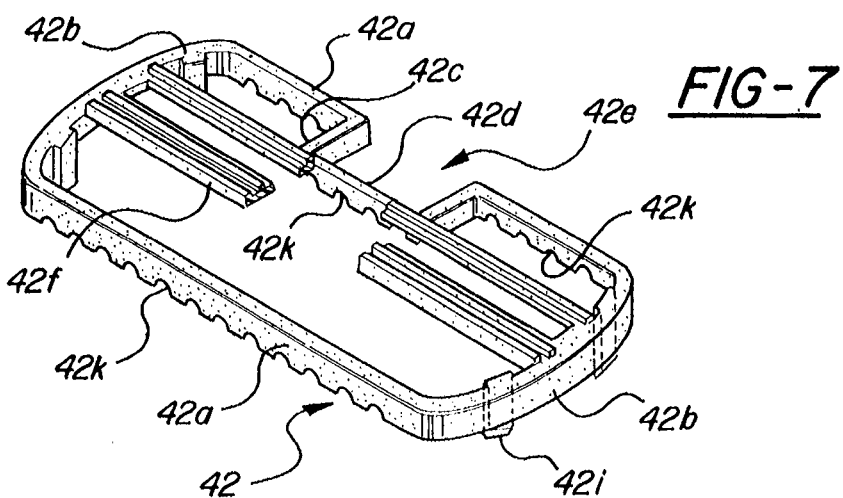
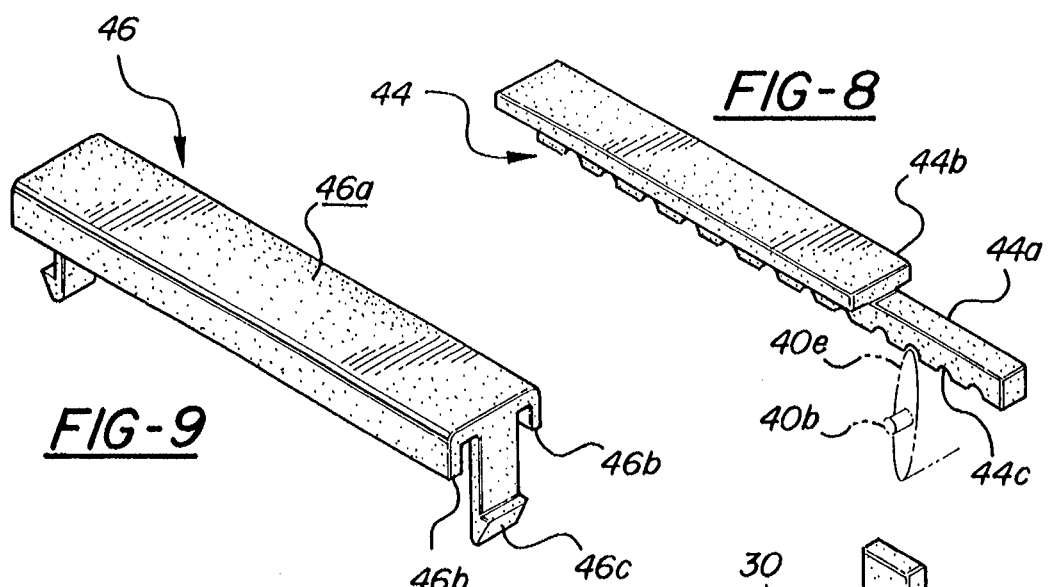
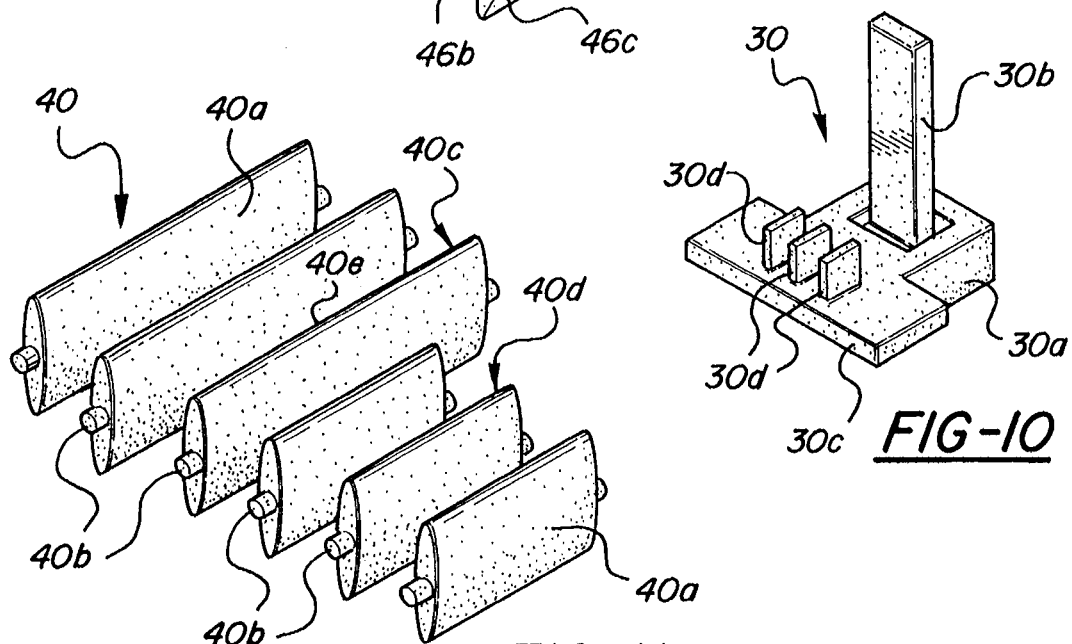

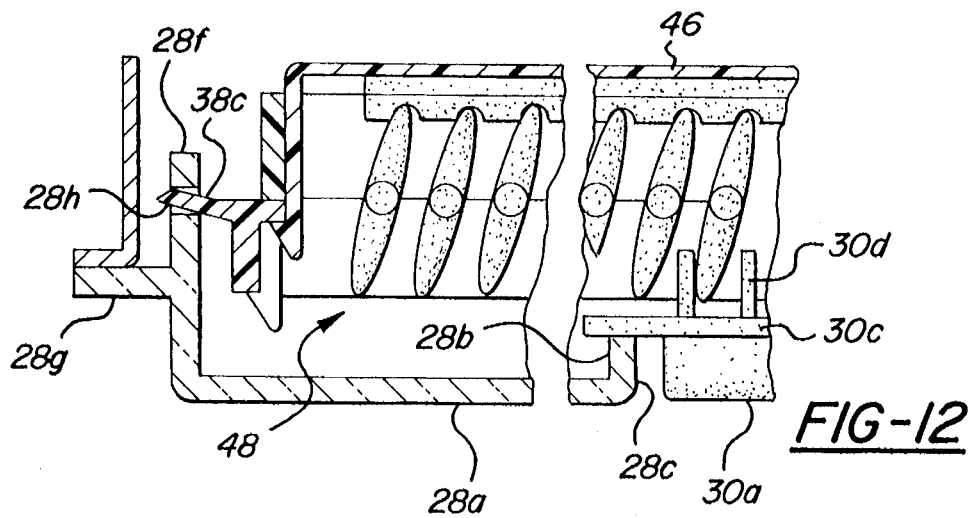
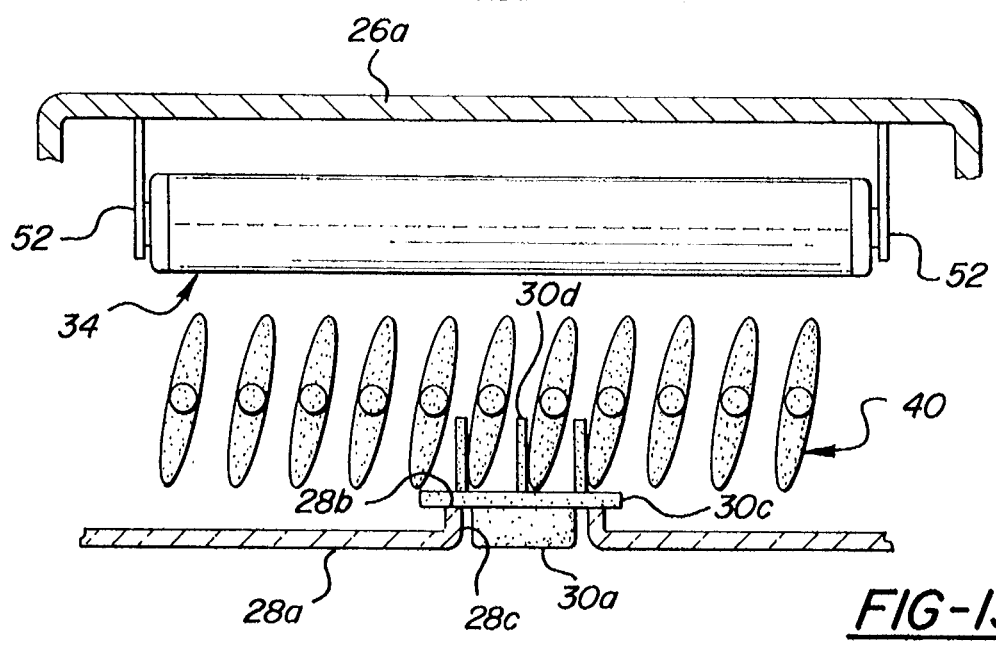
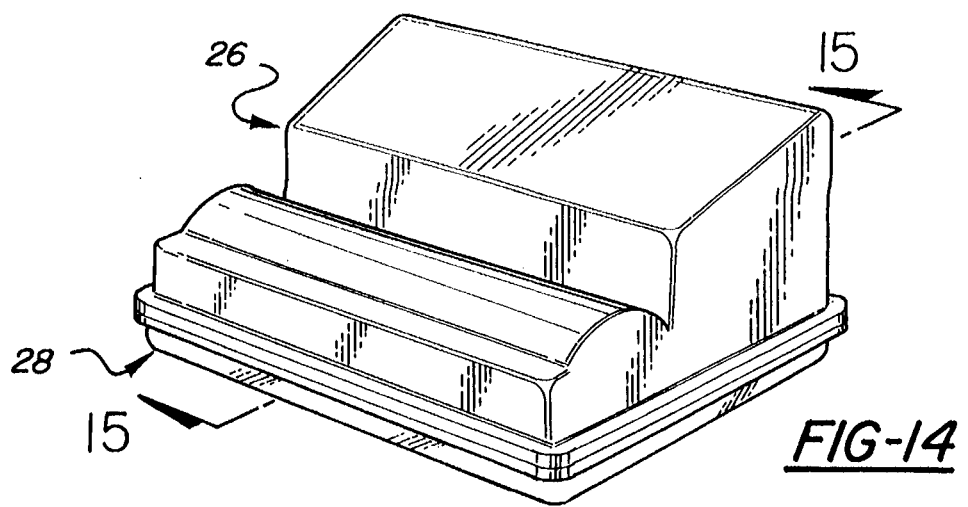

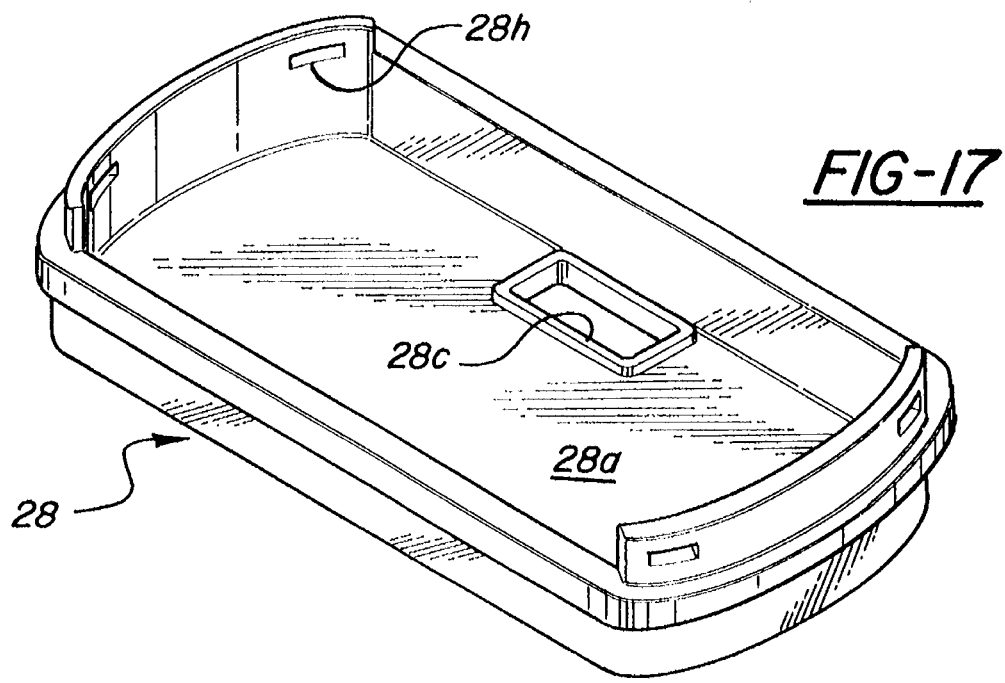
FIG-17
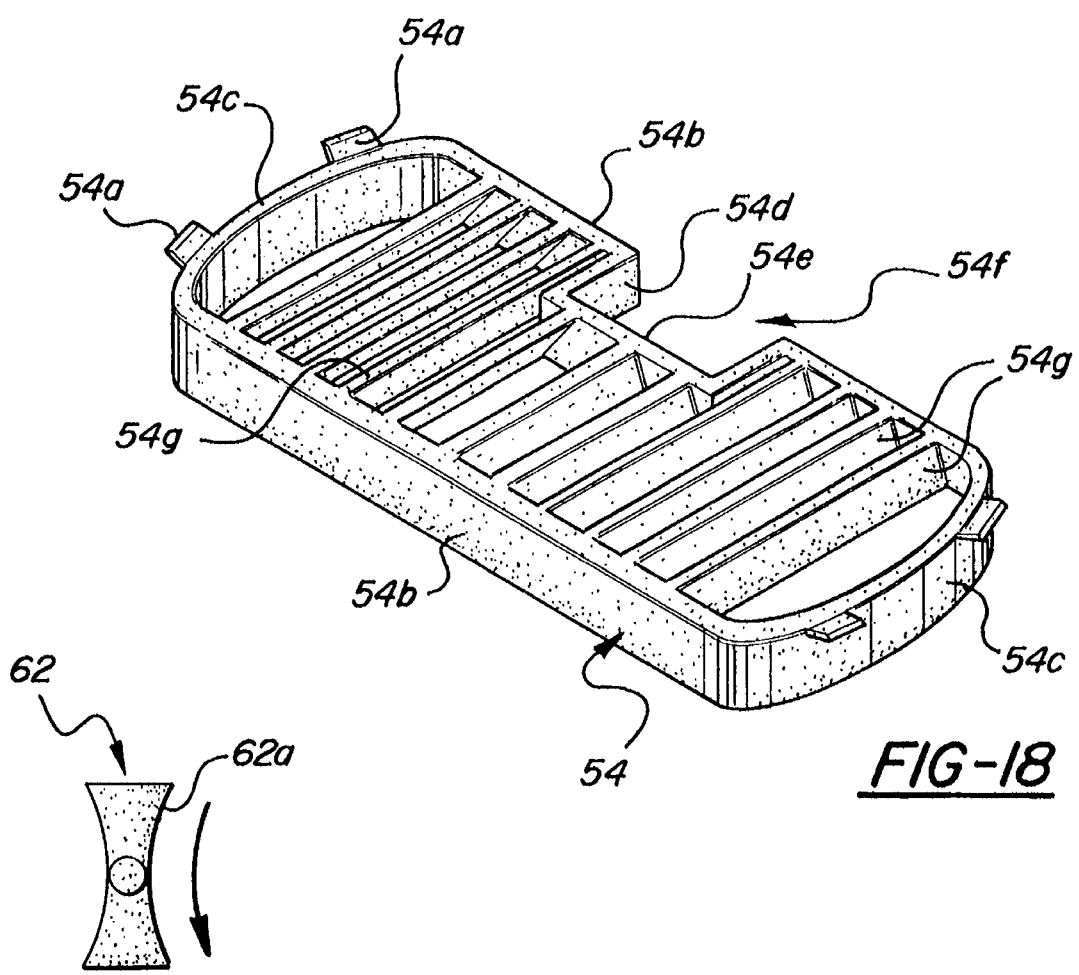
FIG-18
FIG-19

INTERIOR LAMP FOR MOTOR VEHICLE

BACKGROUND OF THE INVENTION

This invention relates to lamps and more particularly to a lamp intended especially for use as an interior or courtesy lamp in a motor vehicle to provide light to the passenger compartment of the vehicle.

Courtesy lamps are commonly used in vehicles to provide interior lighting for vehicles such as for entering and exiting. These lamps are intended to generally light the interior of the vehicle so that a person entering the vehicle can easily see to safely enter the vehicle and also confirm that an intruder is not present in the vehicle. Additional lamps are typically provided to provide a more focussed light for reading maps and the like. These additional lights emit a more focussed spotlight type light which increases light intensity and also prevents the light from spreading around the vehicle interior and thus reducing the driver's ability to see out of the vehicle. In order to accommodate both requirements two different systems of lighting are generally employed. Such dual lighting systems, however, are complicated and expensive.

SUMMARY OF THE INVENTION

This invention is directed to the provision of an improved vehicle courtesy lamp.

More specifically this invention is directed to the provision of an improved courtesy lamp which also provides focused light for reading and similar purposes.

The invention interior lamp is intended for use with a motor vehicle and is adapted for positioning on the ceiling of the vehicle to provide light to the passenger compartment of the vehicle.

According to an important feature of the invention, the lamp includes a housing adapted to be mounted on the vehicle ceiling within the passenger compartment; a lens mounted on the housing and coacting with the housing to define a cavity; a tubular bulb positioned in the cavity; and a plurality of louvers positioned in side-by-side parallel relation in the cavity between the bulb and the lens. This simple arrangement provides general illumination for the passenger compartment and also allows the focusing of the light to specific areas of the passenger compartment.

According to a further feature of the invention, the lamp further includes means mounting the louvers for selective movement within the cavity and means accessible to a vehicle occupant for moving the louvers in gang fashion within the cavity to selectively vary the direction in which light from the bulb is projected from the lamp. This arrangement allows the lamp to readily function to selectively vary the area of the passenger compartment that is illuminated.

According to a further feature of the invention, the bulb is a fluorescent bulb extending within the cavity in transverse relation to the louvers. This arrangement allows the provision of a linear series of individual light sources for selective directional handling by the louvers.

According to a further feature of the invention, the louvers are mounted for pivotal movement within the cavity; the louvers are positioned in a generally vertical orientation within the cavity and are pivotally mounted intermediate their upper and lower ends; and the moving means comprises means engaging ends of the louvers and means accessible to the occupant for actuating the engaging means. This arrangement allows the louvers to be readily moved by the occupant to a position providing the desired light pattern.

According to a further feature of the invention, the lamp further includes a switch assembly for controlling the bulb and including a push button structure accessible to the occupant; the push button structure is mounted for vertical movement and lateral movement; the push button structure is operative in response to vertical movement to energize the bulb; and the push button structure is operative in response to lateral movement to pivot the louvers. This arrangement provides a single convenient control for turning the lamp on and off and for varying the direction in which light is projected from the lamp.

BRIEF DESCRIPTION OF THE DRAWINGS

FIG. 4 is a cross-sectioned view taken on line 4—4 of FIG. 3;

FIGS. 5 through 11 are perspective views of individual components of the invention lamp;

FIG. 12 is a fragmentary view showing the assembly of the invention lamp;

FIG. 13 is a view showing one aspect of the operation of the invention lamp;

FIG. 14 is a perspective view of a second embodiment of the invention lamp.

FIGS. 17 and 18 are perspective views of individual components of the second embodiment; and FIG. 19 is a view showing an alternate louver configuration.

DETAILED DESCRIPTION OF THE PREFERRED EMBODIMENTS

Figure 1:
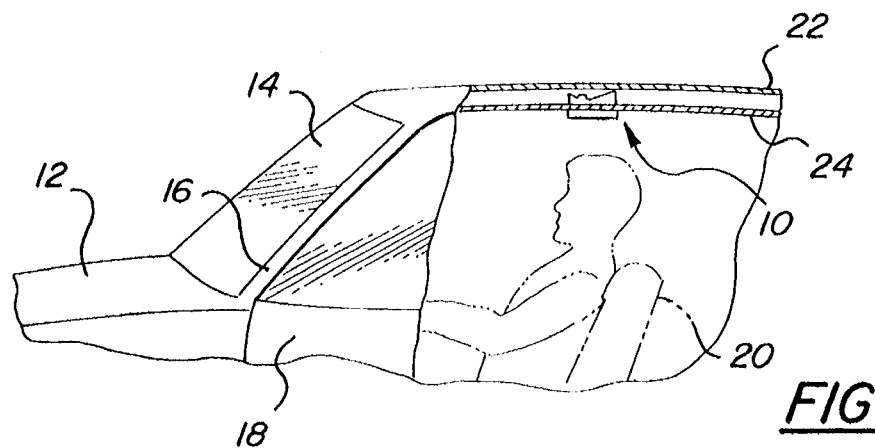
FIG. 1 is a fragmentary view of a motor vehicle employing an interior lamp according to the invention.
Figure 2:
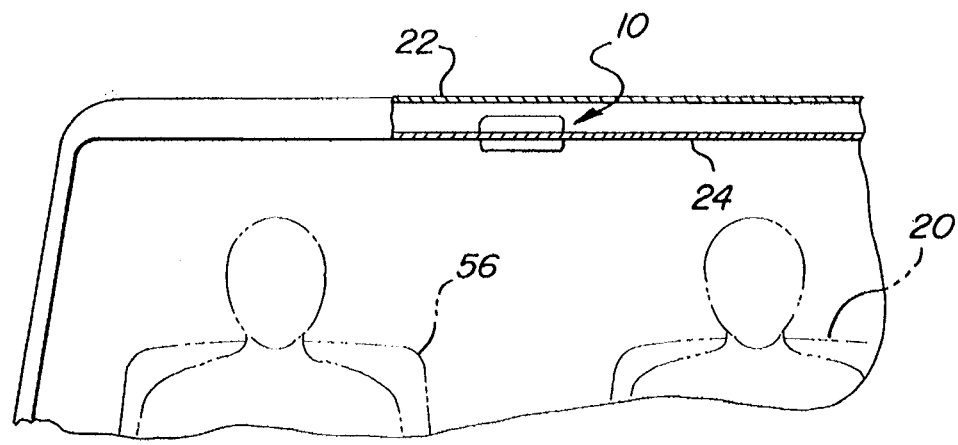
FIG. 2 is a fragmentary frontal view of the motor vehicle of FIG. 1.
Figure 3:
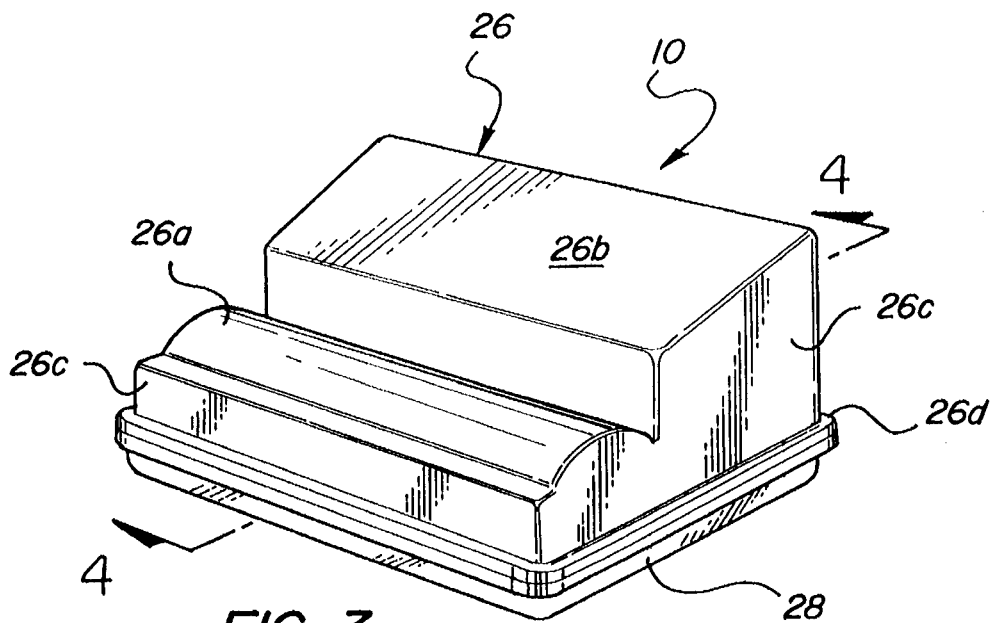
FIG. 3 is a perspective view of a lamp according to a first embodiment of the invention.
Figure 15:
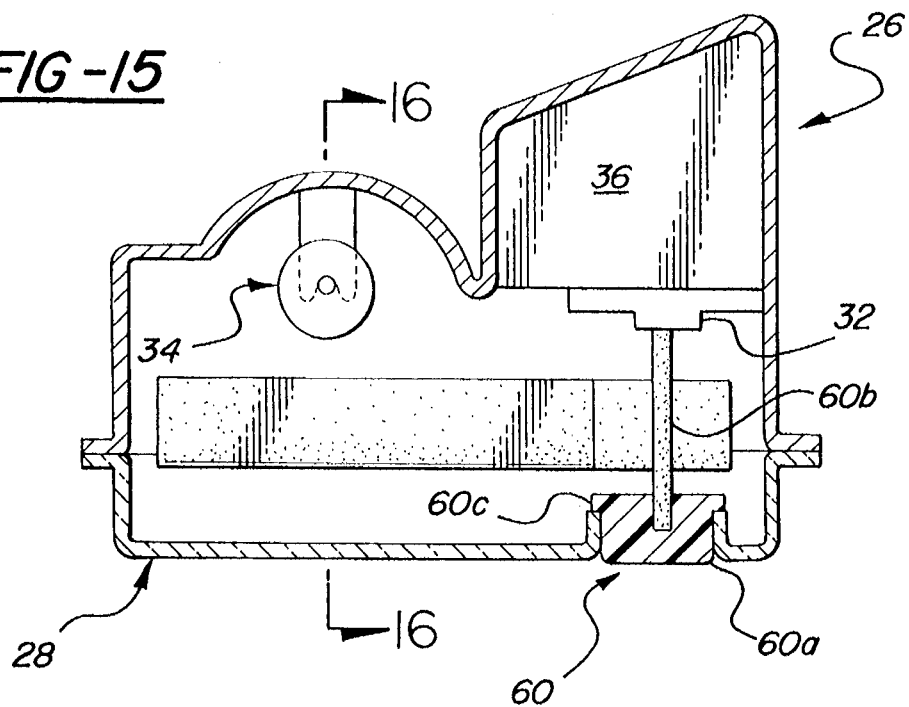
FIG. 15 is a cross-section view taken on line 15—15 of FIG. 14.
Figure 16:
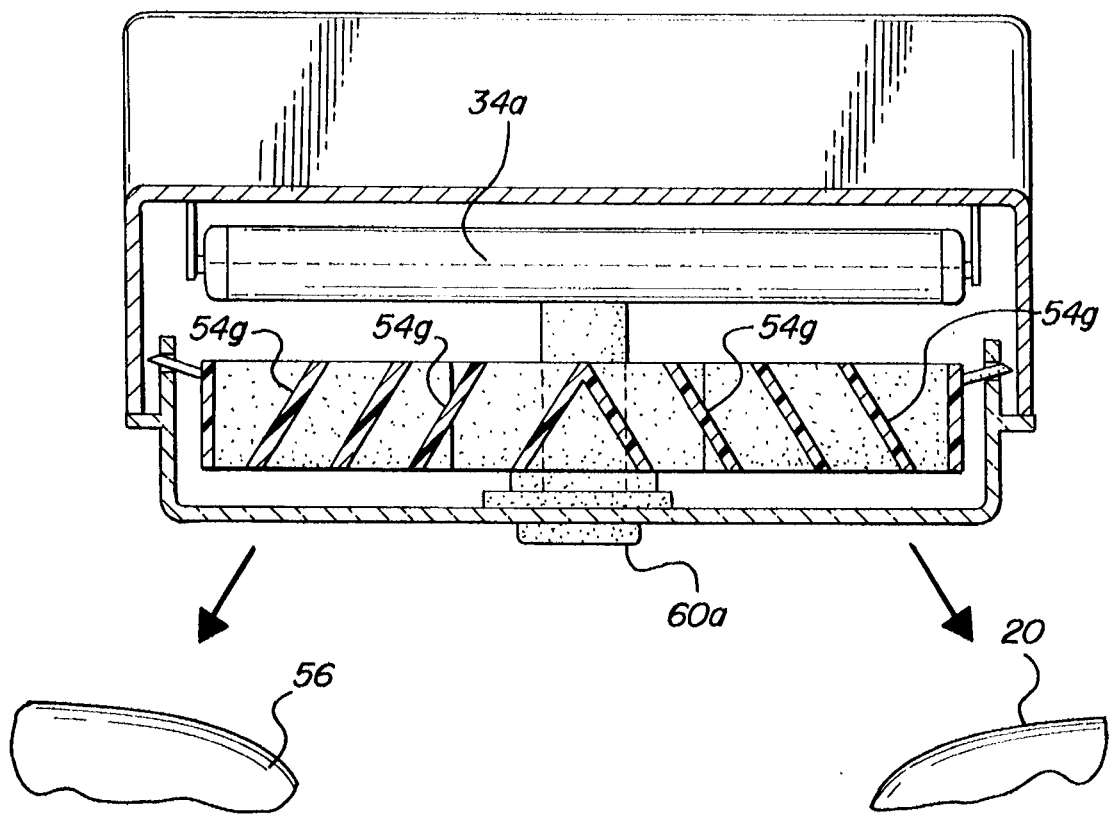
FIG. 16 is a cross-section view taken on line 16—16 of FIG. 15.

The invention lamp 10 is seen generally in FIG. 1 in association with a fragmentarily shown motor vehicle including a hood 12, a windshield 14, an A pillar 16, a door 18, a driver's seat 20, a roof 22, and a ceiling panel 24. As seen, the lamp 10 is positioned in the passenger compartment of the motor vehicle and specifically is positioned in the ceiling panel 24 of the vehicle between the ceiling panel and the roof. The invention lamp may be positioned in a ceiling console or, as shown, may be mounted directly in the ceiling of the vehicle.

The first embodiment of the invention lamp as seen in FIGS. 3–11 includes a housing 26, a lens 28, a pushbutton structure 30, a switch 32, a bulb 34, a ballast 36, a lower retainer 38, louvers 40, an upper retainer 42, a gang bar or slide 44, and a slide retainer 46.

All of the components of the lamp except as otherwise noted or otherwise obvious are formed of a suitable plastics material of transparent, translucent, or opaque characteristic depending on the particular use of the component.

Housing 26 includes a reflector portion 26a, a roof portion 26b, side wall portions 26c and a lower flange portion 26d of oval configuration.

Lens 28 is formed of a suitable transparent plastic material such as acrylic and has an oval configuration corresponding to the oval configuration of housing flange portion 26d. Lens 28 includes a base portion 28a including a rectangular lip 28b defining a rectangular aperture 28c; front and rear side wall portions 28d; end wall portions 28e; upstanding flange portions 28f at the opposite ends of the lens formed as upward extensions of end wall portions 28e; and horizontal flange portions 28g positioned proximate to and outboard of upstanding flange portions 28f.

Housing 26 is secured to lens 28 by securing the lower face of housing flange portion 26d to lens horizontal flange portions 28g and to the upper edges 28h of lens side wall portions 28d by sonic welding. Housing 26 and lens 28 coact to define a lamp cavity 48.

Lower retainer 38 has an oval configuration corresponding generally to the oval configuration of lens 28 and includes front and rear side wall portions 38a, end wall portions 38b, and fingers or prongs 38c extending outwardly and upwardly from end wall portions 38b at circumferentially spaced locations around the periphery of the lower retainer. The rear side wall portion 38a is centrally interrupted by a U structure defined by side wall portions 38d and a transverse wall portion 38e. Side wall portions 38d and transverse wall portion 38e coact to define a pocket 38f having a size and configuration corresponding generally to the aperture 28c in the base 28a of the lens. A series of generally semi-circular upwardly opening bearing surfaces 38g are provided in side wall portions 38a and in transverse wall portion 38e. Lower retainer 38 is mounted within lens 28 by pushing the lower retainer downwardly with respect to the lens until fingers 38c snap into respective apertures 28h provided in the upwardly extending flange portions 28f of the lens.

Upper retainer 42 has an oval configuration corresponding generally to the oval configuration of lower retainer 38 and lens 28 and includes front and rear side wall portions 42a, end wall portions 42b, and a U structure formed in rear side wall portion 42a and defined by side wall portions 42c and transverse wall portion 42d. Side wall portions 42c and transverse wall portion 42d coact to define a pocket 42e in the rear side wall portion corresponding in size and configuration to the pocket 38f formed in lower retainer 38. Upper retainer 42 further includes a transverse wall portion 42f extending between end wall portions 42b generally flush with the upper face of the retainer. Transverse ribs 42g, h, and i are formed on the upper face of wall 42f and a transverse slot 42j is formed between ribs 42h and 42i. A series of generally semi-circular downwardly opening bearing surfaces 42k are formed in the lower edges of side wall portions 42a and the lower edge of transverse wall portion 42d. Bearing surfaces 42k correspond in number and relative disposition to bearing surfaces 38g on lower retainer 38 and the respective bearing surfaces 38g/42k coact, with the upper retainer position over the lower retainer, to define complete circular bearing surfaces arranged in pairs with each pair including a bearing surface along the rear edge of the assembled retainers and a bearing surface along the front edge of the assembled retainers. Upper retainer 42 is positioned on top of an in abutting relation to lower retainer 38 by pressing the upper retainer downwardly with respect to the lower retainer until snap fingers 42l projecting downwardly from the lower edge of the upper retainer snap into place beneath the lower edge 38h of the lower retainer.

Each louver 40 has a generally elliptic cross-sectional configuration and includes a main body blade portion 40a and central trunions 40b at each end of the blade portion. Trunions 40b are sized to be rotatably received in the bearings defined by the coacting bearing surfaces 38g/42k. A plurality of relatively long louvers 40c are provided for positioning between the front and rear walls of the retainers and a plurality of short louvers 40d are provided for positioning between the front wall of the retainers and the transverse walls 38e/42d.

Prior to mounting the upper retainer 42 on the lower retainer 38 utilizing fingers 42l, louver trunions 40b are positioned in the bearing surfaces 38g of the lower retainer whereafter the upper retainer is snapped in place over the lower retainer to complete the bearing surfaces and pivotally mount the louvers.

Slide or gang bar 44 includes a gang bar portion 44a sized to fit slidably in the slot 42j of the upper retainer and a guide portion 44b forming a T-shaped cross sectional configuration with the gang bar portion. With gang bar portion 44a positioned in slot 42j, cutouts 44c in the lower face of the gang bar portion 44a engage the upper edges 40e of respective louvers 40c/40d so that the louvers are ganged together by the gang bar portion 44a whereby sliding movement of gang bar 44 in slot 42j has the effect of pivoting the louvers in unison about the axis of their trunions 40b.

Slide retainer 46 has a U-shaped cross sectional configuration including a main body portion 46a and leg portions 46b. Retainer 46 is positioned over gang bar 44 with the main body portion 46a overlying the slide portion 44b of the gang bar and leg portions 46b positioned respectively between ribs 42g and 42h and rearwardly of rib 42i. Downwardly extending snap fingers 46c at each end of the slide retainer coact with the underface 38h of lower retainer 38 to snappingly secure the slide retainer in position to preclude inadvertent upward movement of the gang bar 44 while allowing free sliding movement of the gang bar in the slot 42j to selectively pivot the louvers.

Pushbutton structure 30 includes a pushbutton portion 30a positioned in lens aperture 28c, a finger 30b upstanding from the pushbutton portion, a guide portion 30c positioned slidably on the lip 28b surrounding lens aperture 28c, and a plurality of prongs 30d upstanding from guide portion 30c and spaced transversely by a distance corresponding to the spacing between successive louvers. Prong portions 30d have a thickness such as to allow them to fit comfortably between successive louvers. Two or three of the louvers may be engaged between the successive prongs 30d with the result that lateral or transverse movement of the pushbutton structure 30, as permitted by the relatively large transverse dimension of the aperture 28c as compared to the transverse dimension of the pushbutton portion 30a, has the effect of pivoting the engaged louvers and, via the gang bar 44, all of the louvers.

Ballast 36 is of known form and is shown schematically positioned in the upper region of the housing 26 beneath the roof 26b. Switch 32 is positioned beneath the ballast 36 and fluorescent bulb 34 is positioned centrally beneath the semi-circular reflector portion 26a of the housing. Upward movement of the pushbutton structure 30 in response to upward pushing movement by the finger 50 of an occupant of the vehicle actuates the switch 32 which in turn turns the fluorescent bulb 34 on and off. Suitable fixturing 52 is provided to mount the opposite ends of the fluorescent bulb within the housing and a reflective coating, or alternatively a separate reflective member, is positioned on the interior surface of housing reflector portion 26a to direct the light rays emitted by the fluorescent tube downwardly. It will be understood that the fluorescent tube provides a linear light source extending along the length of the tube. It will be further understood that the individual louvers 40 allow the light emanating from the light source to be individually controlled and directed so as to selectively define the direction and intensity of the light delivered to any given portion of the passenger compartment of the vehicle. Pushbutton structure 30 is arranged relative to the louvers such that sufficient upward movement of the pushbutton structure is allowed by the louvers to provide for actuation of the switch 32. The pushbutton structure 30 thus provides the on and off function for the lamp as well as providing the louver adjustment function.

The second embodiment of the invention lamp seen in FIGS. 14 through 18 is broadly similar to the first embodiment seen in FIGS. 1 through 13 with the exception that the louvers are fixed rather than being pivotal.

Thus, in common with the first embodiment, the second embodiment includes a housing 26, a lens 28, a fluorescent bulb 34, a ballast 36, and a switch 32. However, the lower retainer, upper retainer, gang bar, and slide retainer of the first embodiment are replaced with a single unitary molded louver structure 54, and the pushbutton is simplified in view of the fact that it is no longer necessary for this structure to accomplish pivoting of the vanes. Louver structure 54, like the lower retainer in the first embodiment, is retained relative to the lens by fingers 54a snappingly received in apertures 28h in the lens.

Louver structure 54 includes front and rear side wall portions 54b, end wall portions 54c and a U-shaped structure defined by side wall portions 54d and a transverse wall portion 54e and coacting to define a pocket 54f in the rear side wall portion of the louver structure positioned in overlying relation to the aperture 28c in the bottom wall 28a of the lens 28. Louver structure 54 further defines a plurality of louvers 54g extending between the front side wall portion 54b and the rear side wall portion 54b and between the front side wall portion 54b and transverse wall portion 54e. The louvers are arranged in two series, divided in the middle of the louver, including a right-hand louver series (according to motor vehicle convention with the lamp installed in the ceiling of the vehicle) angled downwardly toward the front passenger seat 56 of the vehicle and a left-hand louver series angled downwardly toward the driver's seat 20 of the vehicle. The central most louver of the right-hand series of louvers is joined at its top edge to the central most louver of the left-hand series of louvers to form an A configuration in cross section at the center of the louver structure. Note that the louvers proximate the center of the louver structure are foreshortened to accommodate the pocket 54f.

The pushbutton structure 60 of the second embodiment comprises simply a pushbutton 60a sized to fit in the aperture 28c of the lens and a finger 60b extending upwardly through louver structure pocket 54f for coaction with the switch 32 in response to upward movement of the pushbutton structure to turn on the bulb 34. Pushbutton 60a further includes an upper flange 60c coacting with lip 28b to preclude downward separation of the pushbutton structure from the lamp assembly. Whereas in the first embodiment the aperture 28c in the lens must be transversely oversized with respect to the pushbutton to accommodate lateral movement of the pushbutton to pivot the louvers, in the second embodiment the aperture 28c may be of the same general size and configuration as the pushbutton 60a.

As with the first embodiment, the louver construction of the second embodiment allows a series of individual light sources 34a generated by the fluorescent bulb 34 to be individually handled by the individual louvers so that light may be concentrated, for example, proximate the front passenger seat of the vehicle and further light may be concentrated proximate the driver's seat of the vehicle.

FIG. 19 illustrates an alternate louver configuration 62 in which the louvers, rather than having an elliptical cross-sectional configuration, define parabolic surfaces 62a on one or both sides of the louver. The parabolic surfaces 62a have the effect of collimating the light rays issuing from the bulb so that the rays leave the louver in a parallel concentrated fashion whereby to increase the intensity of light delivered to a selected area.

The invention lamp assembly will be seen to provide a simple and effective means for selectively and efficiently distributing light emanating from a source comprising a linear series of light sources.

Whereas preferred embodiments of the invention have been illustrated in detail, it will be apparent that various changes may be made in the disclosed embodiments without departing from the scope or spirit of the invention.

I claim:

1. An interior lamp for a motor vehicle adapted for positioning on the ceiling of the vehicle to provide light to the passenger compartment of the vehicle, the lamp including:

a housing adapted to be mounted on the vehicle ceiling within the passenger compartment and including side wall portions defining an open lower housing end;

a lens mounted on the open lower end of the housing and coacting with the housing to define a cavity;

a tubular bulb positioned in the cavity and extending across the cavity between opposed side wall portions of the housing;

a plurality of louvers positioned in side by side parallel relation in the cavity between the bulb and the lens and extending transversely to the bulb;

means mounting the louvers for selective pivotal movement within the cavity; and means accessible to a vehicle occupant for moving the louvers in gang fashion within the cavity to selectively vary the direction in which the light from the bulb is projected from the lamp and thereby selectively vary the area of the passenger compartment that is illuminated.

2. A lamp according to claim 1 wherein the accessible means includes lamp control structure including a working portion engaging the louvers and an actuator portion extending downwardly through an aperture in the lens for access by the occupant.

3. A lamp according to claim 1 wherein:

the bulb is a fluorescent bulb extending within the cavity in transverse relation to the louvers.

4. A lamp according to claim 2 wherein the lamp further includes means operative in response to actuation of the actuator portion to energize the bulb.

5. A lamp according to claim 1 wherein:

each louver extends substantially from front to rear of the cavity and;

louvers are provided in side-by-side relation substantially totally across the width of the cavity.

6. A lamp according to claim 1 wherein:

the louvers are positioned in a generally vertical orientation within the cavity;

the louver mounting means pivotally mounts the louvers intermediate their upper and lower ends; and the accessible means comprises means engaging ends of the louvers and means accessible to the occupant for actuating the engaging means.

7. An interior lamp for a motor vehicle adapted for positioning on the ceiling of the vehicle to provide light to the passenger compartment of the vehicle, the lamp including:

a housing adapted to be mounted on the vehicle ceiling within the passenger compartment;

a lens mounted on the housing and coacting with the housing to define a cavity;

a tubular bulb positioned in the cavity;

a plurality of louvers positioned in side by side parallel relation in the cavity, in a generally vertical orientation, between the bulb and the lens;

means pivotally mounting the louvers intermediate their upper and lower ends for selective pivotal movement within the cavity; and means accessible to a vehicle occupant for pivotally moving the louvers in gang fashion within the cavity to selectively vary the direction in which the light from the bulb is projected from the lamp and thereby selectively vary the area of the passenger compartment that is illuminated;

the moving means comprising means engaging ends of the louvers and including a push button structure accessible to the occupant, means mounting the push button structure for vertical movement and lateral movement, means operative in response to vertical movement of the push button structure to energize the bulb, and means operative in response to lateral movement of the push button structure to pivot the louvers.

8. A lamp according to claim 7 wherein:

the push button structure includes a push button and laterally spaced prongs extending upwardly between adjacent louvers so that lateral movement of the push button structure pivots the adjacent louvers.

9. A lamp according to claim 8 wherein:

the lamp further includes a gang bar engaging the upper ends of the louvers.

10. An interior lamp for a motor vehicle adapted for positioning on the ceiling of the vehicle to provide light to the passenger compartment of the vehicle, the lamp including:

a housing adapted to be mounted on the ceiling within the passenger compartment;

a lens mounted on the housing and coacting with the housing to define a cavity;

a tubular bulb positioned in the cavity;

a plurality of louvers positioned in side-by-side parallel relation in the cavity between the bulb and the lens;

means for mounting the louvers for selective pivotal movement within the cavity, the louvers being positioned in a generally vertical orientation within the cavity and being pivotally mounted intermediate their upper and lower ends;

the moving means comprising means engaging ends of the louvers and including a push button structure accessible to the occupant, means for mounting the push button structure for vertical movement and lateral movement, means operative in response to vertical movement of the push button structure to illuminate the bulb, and means operative in response to lateral movement of the push button structure to pivot the louvers.

11. A lamp according to claim 10 wherein:

the lamp further includes a ballast positioned within the housing in overlying relation to the louvers.

12. A lamp according to claim to claim 10 wherein:

the push button structure includes a push button and laterally spaced prongs extending upwardly between adjacent louvers so that lateral movement of the push button structure pivots the adjacent louvers.

13. An interior lamp for a motor vehicle adapted for positioning on the ceiling of the vehicle to provide light for the passenger compartment of the vehicle, the lamp including:

a housing adapted to be mounted on the vehicle ceiling within the passenger compartment;

a lens positioned beneath and secured to the housing and coacting with the housing to define a cavity;

means defining a linear light source extending across the width of the cavity;

a louver structure positioned within the housing and defining a plurality of side-by-side parallel louvers extending transversely to the linear light source and mounted for pivotal movement within the cavity;

an actuator structure accessible to a vehicle occupant;

means operative in response to movement of the actuator structure in a first mode to energize the bulb; and means operative in response to movement of the actuator structure in a second mode to pivot the louvers.

14. A lamp according to claim 13 wherein:

the linear light source comprises a fluorescent bulb; and the lamp further includes a ballast positioned in the housing above the louvers and proximate the bulb.

15. An interior lamp for a motor vehicle adapted for positioning on the ceiling of the vehicle to provide light for the passenger compartment of the vehicle, the lamp including:

a housing adapted to be mounted on the vehicle ceiling within the passenger compartment;

a lens positioned beneath and secured to the housing and coacting with the housing to define a cavity;

a fluorescent bulb extending across the width of the cavity;

a louver structure positioned within the housing and defining a plurality of side-by-side parallel louvers extending transversely to the fluorescent bulb;

a ballast positioned in the housing above the louvers and proximate the bulb; and a switch assembly positioned in the housing for actuating the bulb, the switch assembly including a push button extending downwardly through an aperture in the lens to provide access by an occupant of the vehicle.

16. A lamp according to claim 13 wherein:

the louver structure includes a plurality of louvers which are foreshortened to define a pocket; and the push button directly underlies the pocket and the switch assembly extends upwardly through the pocket.

17. An interior lamp for a motor vehicle adapted for positioning on the ceiling of the vehicle to provide light for the passenger compartment of the vehicle, the lamp including:

a housing adapted to be mounted on the vehicle ceiling within the passenger compartment;

a lens positioned beneath and secured to the housing and coacting with the housing to define a cavity;

means defining a linear light source extending across the width of the cavity; and a louver structure positioned within the housing and defining a plurality of side-by-side parallel louvers extending transversely of the linear light source, the louver structure defining a first series of louvers on one side of the louver structure angled to direct light toward the front passenger seat of the vehicle and a second series of louvers on an opposite side of the louver structure oppositely angled to direct light toward the driver's seat of the vehicle.

18. An interior lamp for a motor vehicle adapted for positioning on the ceiling of the vehicle to provide light for the passenger compartment of the vehicle, the lamp including:

a housing adapted to be mounted on the vehicle ceiling within the passenger compartment;

a lens positioned beneath and secured to the housing and coacting with the housing to define a cavity;

means defining a linear light source extending across the width of the cavity; and a louver structure positioned within the housing and defining a plurality of side-by-side parallel louvers extending transversely to the linear light source;

the louver structure defining a first series of louvers on one side of the louver structure angled to direct light toward the front passenger seat of the vehicle and a second series of louvers on an opposite side of the louver structure angled to direct light toward the driver's seat of the vehicle;

the louver structure comprising a unitary molded part defining the first and second series of louvers and further defining a peripheral wall circumscribing the louvers.

19. An interior lamp for a motor vehicle adapted for positioning on the ceiling of the vehicle to provide light for the passenger compartment of the vehicle, the lamp including:

a housing adapted to be mounted on the vehicle ceiling within the passenger compartment;

a lens positioned beneath and secured to the housing and coacting with the housing to define a cavity;

means defining a linear light source extending across the width of the cavity;

a louver structure positioned within the housing and defining a plurality of side-by-side parallel louvers extending transversely to the linear light source;

the lens including upstanding flange portions at opposite ends of the lens; and the louver structure including outwardly extending circumferentially spaced fingers positioned in apertures in the lens flange portions to mount the louver structure within the lens.

20. A lamp according to claim 19 wherein:

the lens further includes horizontal flange portions proximate and outboard of the upstanding flange portions; and lower edge portions of the housing are supported on the horizontal flange portions.

* * * * *